(12) United States Patent
Shain et al.

(10) Patent No.: US 7,457,722 B1
(45) Date of Patent: Nov. 25, 2008

(54) CORRELATION OF APPLICATION INSTANCE LIFE CYCLE EVENTS IN PERFORMANCE MONITORING

(75) Inventors: Tomer Shain, Kiron (IL); John A. Colgrove, Los Altos, CA (US)

(73) Assignee: Symantec Operating Corporation, Mountain View, CA (US)

( * ) Notice: Subject to any disclaimer, the term of this patent is extended or adjusted under 35 U.S.C. 154(b) by 440 days.

(21) Appl. No.: 10/990,894

(22) Filed: Nov. 17, 2004

(51) Int. Cl.
*G06F 3/00* (2006.01)
(52) U.S. Cl. ............... 702/182; 702/183; 702/188; 702/189
(58) Field of Classification Search ............. 702/119, 702/181–183, 185, 186, 108, 123, 188, 189; 700/86; 707/100; 717/151; 714/39
See application file for complete search history.

(56) References Cited

U.S. PATENT DOCUMENTS

| | | | |
|---|---|---|---|
| 5,958,010 A | 9/1999 | Agarwal et al. | 709/224 |
| 7,107,339 B1 | 9/2006 | Wolters | 709/224 |
| 2001/0052087 A1 | 12/2001 | Garg et al. | |
| 2004/0199517 A1* | 10/2004 | Casati et al. | 707/100 |
| 2004/0255282 A1* | 12/2004 | Eruhimov et al. | 717/151 |
| 2007/0043531 A1* | 2/2007 | Kosche et al. | 702/182 |

* cited by examiner

*Primary Examiner*—Eliseo Ramos Feliciano
*Assistant Examiner*—Felix E Suarez
(74) *Attorney, Agent, or Firm*—Robert C. Kowert; Meyertons, Hood, Kivlin, Kowert & Goetzel, P.C.

(57) ABSTRACT

A system and method for performance monitoring including instance life cycle event monitoring is disclosed. A performance monitoring system may correlate performance data to application instance life cycle events. Changes in performance at an instance level, application level or tier level may be related to application instance life cycle events such as creation, migration and destruction. In one embodiment, a performance monitoring method may include collecting performance data for one or more application instances, detecting one or more instance life cycle events associated with the one or more application instances, correlating the performance data to the one or more instance life cycle events, and storing the correlated performance data.

22 Claims, 9 Drawing Sheets

CORRELATION OF APPLICATION INSTANCE LIFE CYCLE EVENTS IN PERFORMANCE MONITORING

BACKGROUND OF THE INVENTION

1. Field of the Invention

This invention relates to the field of computer processing and, more particularly, to the monitoring of application performance.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. As a result, the importance of monitoring and maintaining the quality of computational services has increased dramatically.

The performance of computational services may be monitored on both the server side and the client side. For example, the response times of a web server may be monitored to ensure that customers are easily able to access certain web pages. Monitoring the server side may comprise monitoring one or more applications executing on a cluster of nodes. Such a cluster of nodes may comprise a utility computing environment, wherein the computational power of one or more servers may be purchased as needed. Alternatively, dozens or hundreds of nodes may be organized into interconnected tiers of web servers, application servers and databases. Each node in such a system may execute multiple instances of one or more applications, with each instance operable to handle a different client request.

In such a distributed computing environment, application instances may be created or destroyed as demand changes. Application instances may also migrate from node to node in response to a hardware or software failure, or in response to a load-balancing algorithm, for example. However, monitoring systems may be unable to track the migration of instances from node to node, thereby preventing the monitoring system from presenting a complete picture of a given application instance. Furthermore, monitoring systems may not be operable to monitor data on the creation or destruction of application instances. Existing prior art software performance monitors do not correlate performance data with events, such as the creation, migration or destruction of a particular application instance, and across all instances of a particular application, application group, and/or technology tier.

SUMMARY

A system and method for performance monitoring including instance life cycle event monitoring is disclosed. A performance monitoring system may correlate performance data to application instance life cycle events. Changes in performance at an instance level, application level or tier level may be related to application instance life cycle events such as creation, migration and destruction. In one embodiment, a performance monitoring method may include collecting performance data for one or more application instances, detecting one or more instance life cycle events associated with the one or more application instances, correlating the performance data to the one or more instance life cycle events, and storing the correlated performance data.

In one embodiment, the one or more application instances may be instances of an application, and correlating said performance data to one or more instance life cycle events may comprise correlating the one or more instance life cycle events to the performance of the application. Correlating the performance data to one or more instance life cycle events may also comprise determining the change in performance of the application as the one or more application instances are created and destroyed, or may further comprise determining the change in performance of the application as the one or more application instances migrate from one location to another location.

In another embodiment, the one or more application instances may be instances of a plurality of applications, the plurality of applications may be part of an application tier, and correlating said performance data to one or more instance life cycle events may comprise correlating the one or more instance life cycle events to the performance of the application tier.

In still another embodiment, the method may comprise monitoring performance of an application instance, detecting a migration event associated with the application instance, continuing to monitor the performance of the application instance, correlating performance data to the migration event, and storing correlated performance data. In such an embodiment, the migration event may comprise the application instance migrating from a first location to a second location, and correlating performance data to the migration event may comprise relating the performance data to the first and second locations. Furthermore, detecting a migration event may comprise tracking the application instance with an instance ID.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
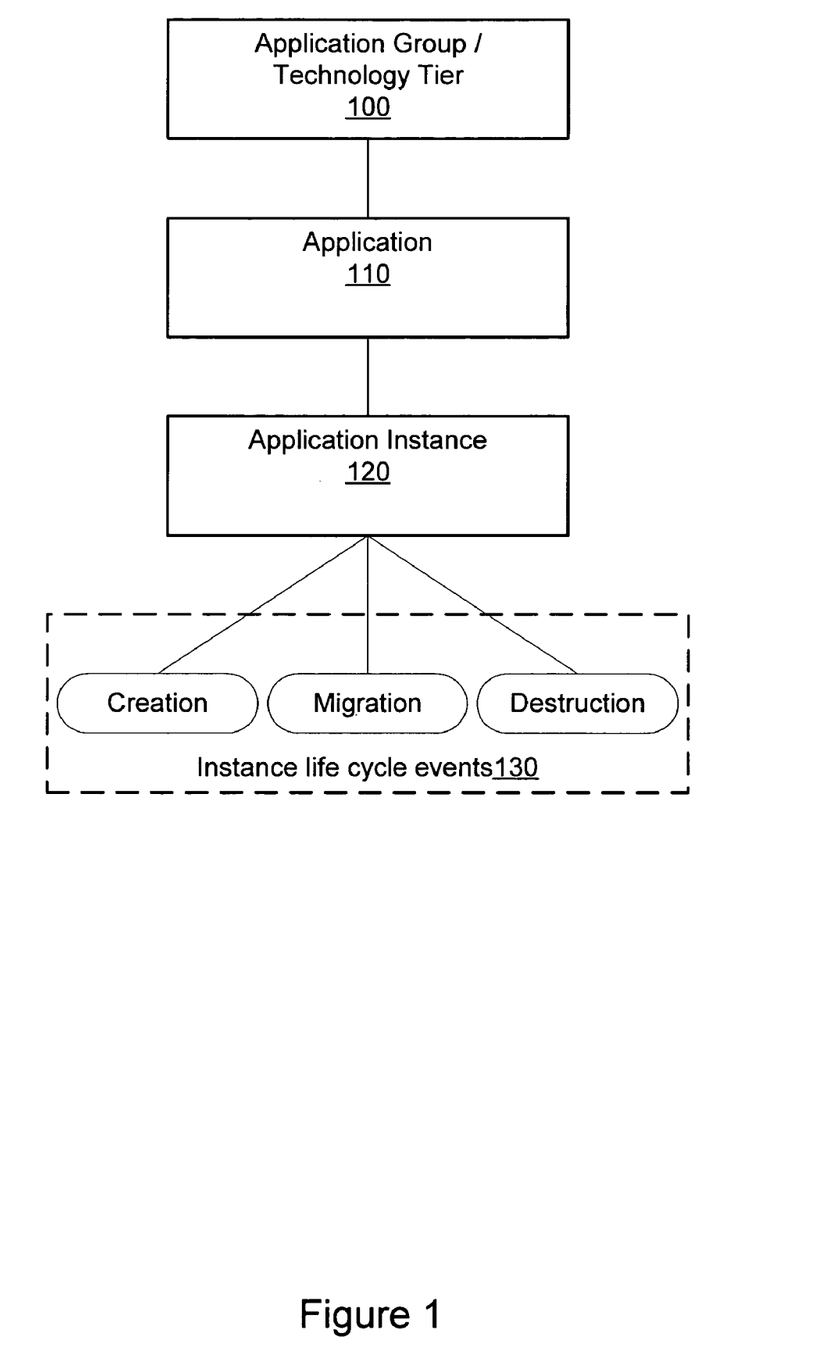
FIG. 1 is a block diagram of an application hierarchy, according to one embodiment.

Turning now to FIG. 1, a diagram of an application hierarchy is shown. An enterprise system, for example, may include an application group or technology tier 100. For example, a technology tier may be an application server tier and an application group may be the business logic applications supported by the application server tier. A back-end storage tier and database application group is another example of a technology tier and application group. An application group or technology tier 100 may include one or more applications 110, each of which may in turn comprise a plurality of application instances 120, as will be described below. In one embodiment, application group/technology tier 100, may include a set of related applications 110 executing together for a common purpose. For example, each application 110 in application group 100 may execute as a web server cluster for an e-commerce site. Alternatively, in another embodiment, applications 110 in application group 100 may be grouped together for performance comparison purposes. For example, two different types of web server applications 110 may be grouped together in application group 100 to compare relative efficiencies.

Each application 110 may carry out a variety of functions, including but not limited to, web server functions, application server functions and database functions. In one embodiment, each application instance 120 may be a separate entity operable to carry out a distinct task. For example, each application instance 120 may be a distinct web server operable to service one web page request at a time. In one embodiment, multiple server nodes may each execute one or more application instances 120, from one or more distinct applications 110, at any given time.

Each application instance 120 may undergo one or more instance life cycle events 130. More particularly, each application instance 120 may be created on a server, may migrate from a first server to a second server, and may be destroyed on a server. The term "server" is used herein to denote any type of computing node capable of executing an application instance, and is not limited to traditional "client-server" environments. As will be described in further detail below, a performance monitoring system may be operable to monitor the instance life cycle events 130 undergone by each application instance 120, and relate the instance life cycle events 130 to collected performance data for each application instance 120. Furthermore, the performance monitoring system may be operable to correlate and/or compare performance data on a plurality of application instances 120 from a single application 110, and to correlate and/or compare performance data on a plurality of applications 110 in a single application group 100.

Figure 2:
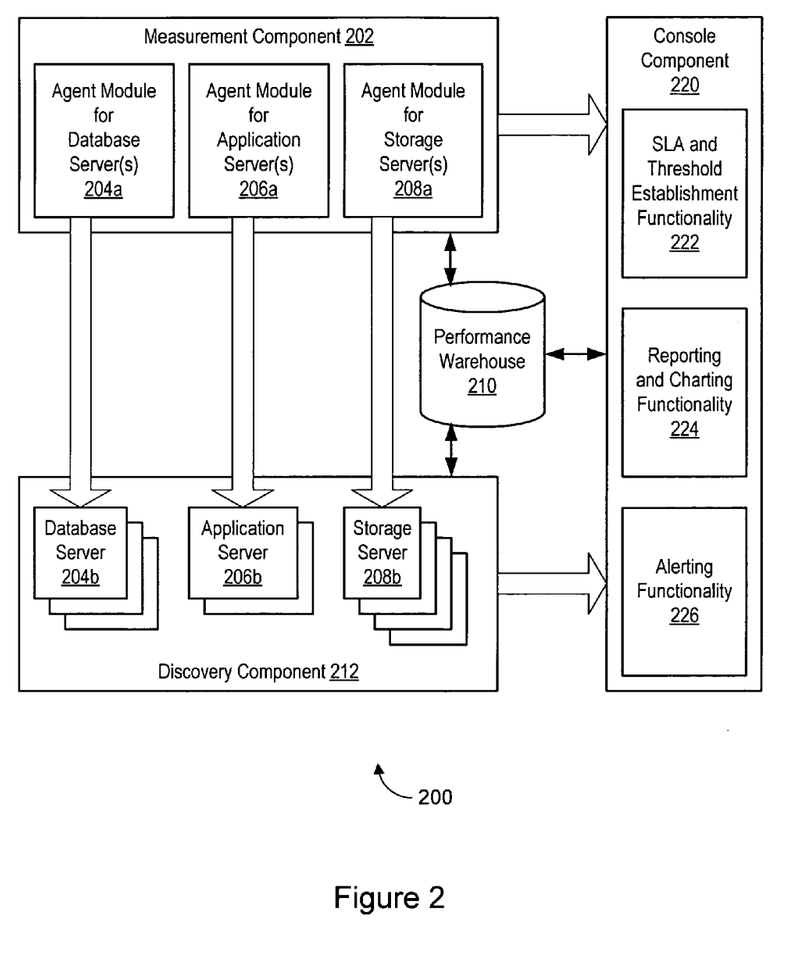
FIG. 2 is a block diagram of one embodiment of a performance management system.

FIG. 2 is an architecture diagram of a performance monitoring system 200 in an exemplary configuration. As illustrated in FIG. 2, the performance monitoring system 200 may include components such as a measurement component 202 (including various agent modules 204a, 206a, and 208a), a discovery component 212, a console component 220, and a performance warehouse 210. The various components of the performance monitoring system 200 may reside on the same computer system, on different computer systems, or on an arbitrary combination of computer systems.

In one embodiment, the measurement component 202 uses agent software to capture performance metrics on servers running target applications. The measurement component 202 may provide a "breadth-wise" view of performance across multiple technology tiers (e.g., web clients, web servers, networks, application servers, database servers, storage servers, etc.). The measurement component 202 may measure, for example, end-to-end response times from the viewpoint of a user. The measurement component 202 may measure segmented response times from tier to tier and may therefore indicate the location of performance problems in a particular tier.

In one embodiment, a "base" version of the measurement component 202 may provide monitoring of a limited set of targets (e.g., TCP/IP-based applications). The functionality of the measurement component 202 may be augmented with optional agent modules that are customized to gather and analyze data for particular targets (e.g., web clients, web servers, networks, application servers, database servers, storage servers, etc.). For purposes of illustration and example, three agent modules 204a, 206a, and 208a are shown. Other combinations of agent modules may be used in other configurations.

In one embodiment, the discovery component 212 provides identification and resolution of root causes of performance degradation. By permitting a user to "drill down" through various tiers of hardware and software (e.g., individual servers), the discovery component 212 may provide a "depth-wise" view of performance within each of the tiers that a target application crosses. The discovery component 212 may further indicate steps to be taken to fix current problems or avoid future problems.

In FIG. 2, each of the server blocks 204b, 206b, and 208b within the discovery component 212 are intended to represent installations of agent software on the respective servers. For example, the three database server blocks 204b represent three agent software modules associated with three respective database server installations. Likewise, the two application server blocks 206b represent two agent software modules associated with three respective application server installations, and the four storage server blocks 208b represent four agent software modules associated with four respective storage server installations. The combination of servers 204b, 206b, and 208b is provided for purposes of illustration and example and is not intended to be limiting. In some embodiments, the discovery component 212 may be separate from the servers.

In one embodiment, the console component 220 includes a "watchdog" layer that communicates key performance indicators, such as exceptions to service level agreements (SLAs), to appropriate users at appropriate times. The console component 220 may include functionality 222 for establishing SLAs and other thresholds. The console component 220 may include functionality 224 for reporting and charting. The console component 220 may include functionality 226 for providing alerts. Therefore, the console component 220 may function as a management console for user interaction with the measurement component 202 and discovery component 212.

In one embodiment, the performance warehouse 210 includes a repository of performance metrics which are accessible to the other components in the performance monitoring system 200. For example, the historical data in the performance warehouse 210 may be used by the other components to provide short- and long-term analysis in varying degrees of detail, including data on monitored instance life cycle events 130.

In one embodiment, performance monitoring system 200 may be implemented in a variety of versions, each of which is customized for management of a particular class of target software: e.g., various products from PeopleSoft, Inc.; Oracle® database management software and related applications; web-based applications; SAP®); various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware).

As used herein, the term "performance monitoring system" is intended to include all of these disparate, customized software programs.

Figure 3A:
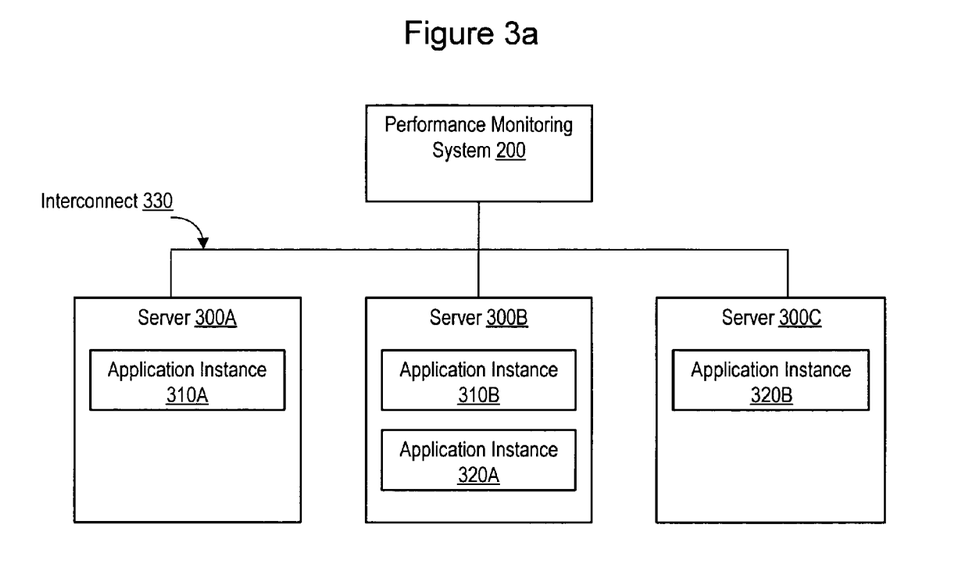
FIGS. 3A-B illustrate an application instance undergoing a creation event, according to one embodiment.

Turning now to FIG. 3a, an exemplary configuration of servers and application instances is shown. FIG. 3a illustrates a plurality of servers 300A-C connected by an interconnect 330. Each server 300A-C may be a database server, application server, web server, or other type of server operable to run one or more application instances 120. Interconnect 330 may be a high-speed data interconnect, such as Fibre channel, a local area network (LAN), a wide area network (WAN), the Internet, or some combination thereof. Interconnect 330 may also be operable to connect performance monitoring system 200 to servers 300A-C.

As illustrated in FIG. 3a, servers 300A-C may execute multiple application instances 310A-B, and multiple application instances 320A-B. Referring back to FIG. 1, applications 310 and 320 may be example of applications 110, while application instances 310A-B and 320A-B may be example of application instances 120. Applications 310 and 320 may perform web server functionality, application server functionality, database functionality, business logic or any other type of application functions. Each application instance 310A-B and 320A-B may be a separate instance of applications 310 and 320, and may be operable to independently carry out a distinct task, such as, for example servicing a client request. One or more measurement agents may also be running on each server for measuring and/or collecting performance data on the application instances.

Figure 3B:
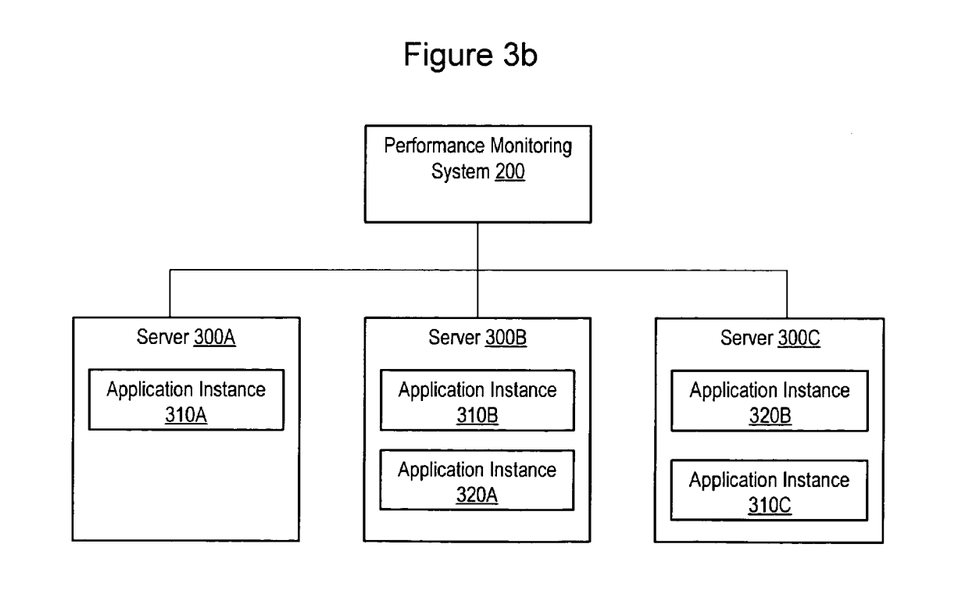

FIG. 3b. illustrates one example of an application instance 110 undergoing a creation event. More particularly, as shown in FIG. 3b, an additional application instance 310C may be created on server 300A. In one embodiment, an additional application instance 110 may be created in response to additional workloads for an application 120. For example, application instance 310C may be a web server application, and may be created in response to a new request for a web page from a client. Alternatively, in another embodiment, an additional application instance 110 may be created as part of a load balancing algorithm. For example, application instance 310C may be a database application, and may be created in response to a load balancing algorithm detecting unused processing capacity on server 300C. Accordingly, in such an example, new application instance 310C may be able to take over a certain percentage of the workload previously handled by application instances 310A-B. In some embodiments, when a new application instance is created a new corresponding measurement agent may also be created. The creation event may be detected by the measurement system which may initiate a new corresponding measurement agent.

Figure 4A:
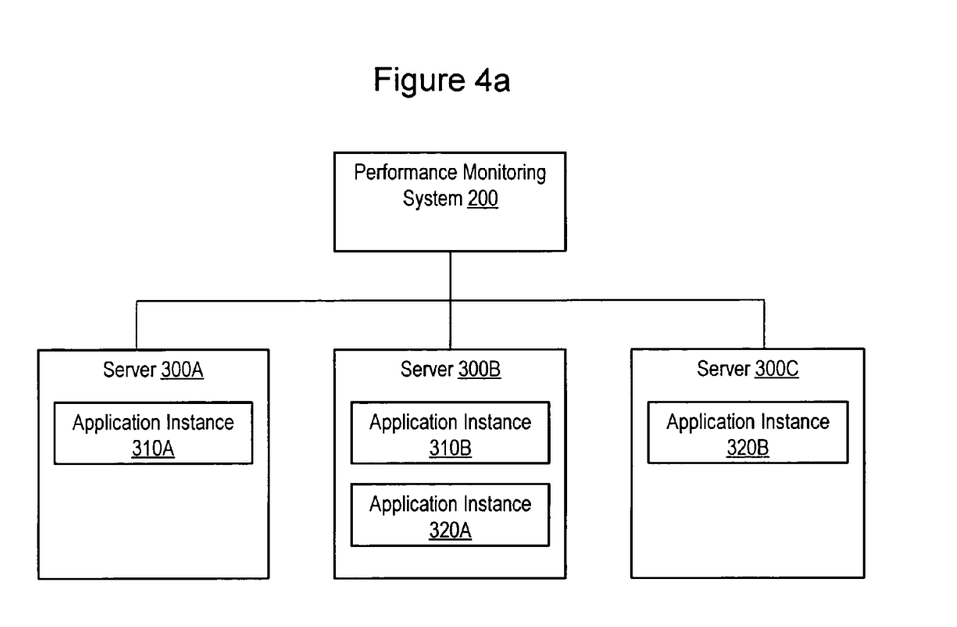
FIGS. 4A-B illustrate an application instance undergoing a destruction event, according to one embodiment.
Figure 4B:
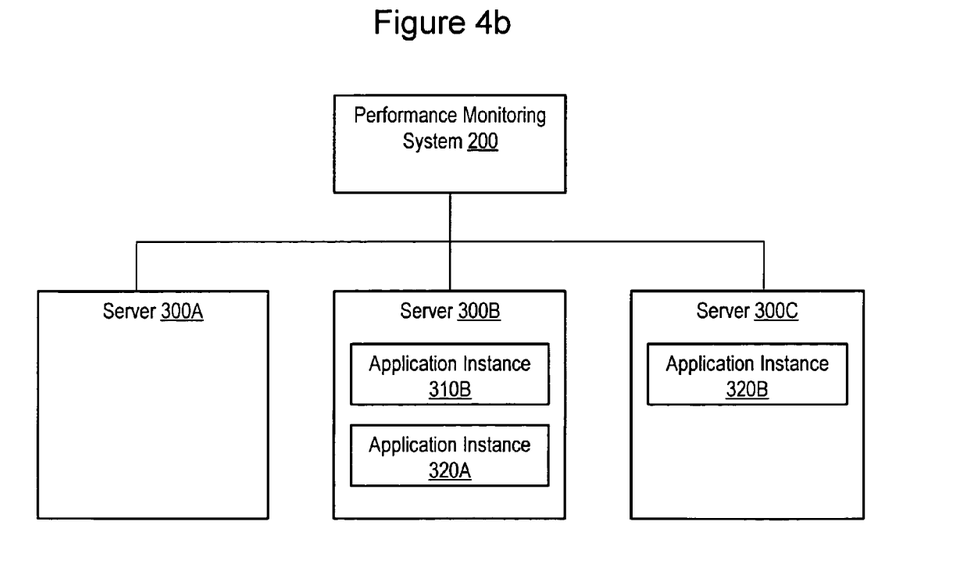

FIGS. 4a and 4b illustrate one example of an application instance 110 undergoing a destruction event. FIG. 4a illustrates an exemplary configuration of servers and application instances 110 identical to that shown in FIG. 3a. In FIG. 4b application instance 310A has been destroyed, or permanently ceased execution on server 300A. In one embodiment, application instances 120 may be destroyed as the workload of an application 120 decreases. For example, application instance 310A may be a web server application which has completely finished a transaction with a client. Accordingly, in such an example, application instance 310A may terminate itself, thereby freeing up computational power on server 300A for other processes. Alternatively, in another embodiment, application instance 310A may encounter a critical error, such as a memory fault for example, which may in turn cause the application instance to cease execution. In some embodiments, when an application instance is destroyed a corresponding measurement agent may also be destroyed. The destruction event may be detected by the measurement system which may initiate destruction of the corresponding measurement agent.

Figure 5A:
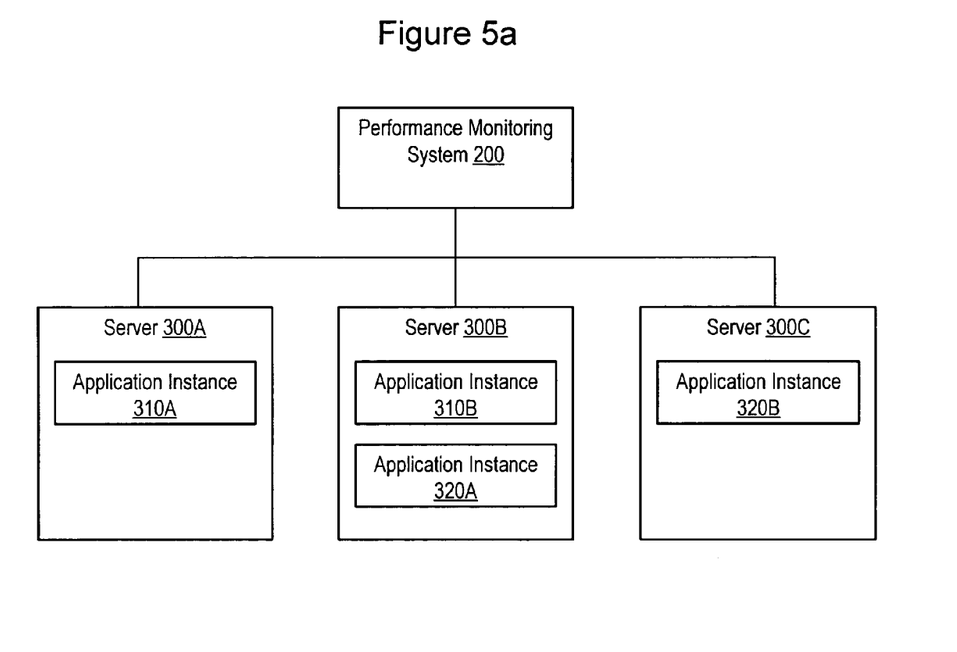
FIGS. 5A-B illustrate an application instance undergoing a migration event, according to one embodiment.
Figure 5B:
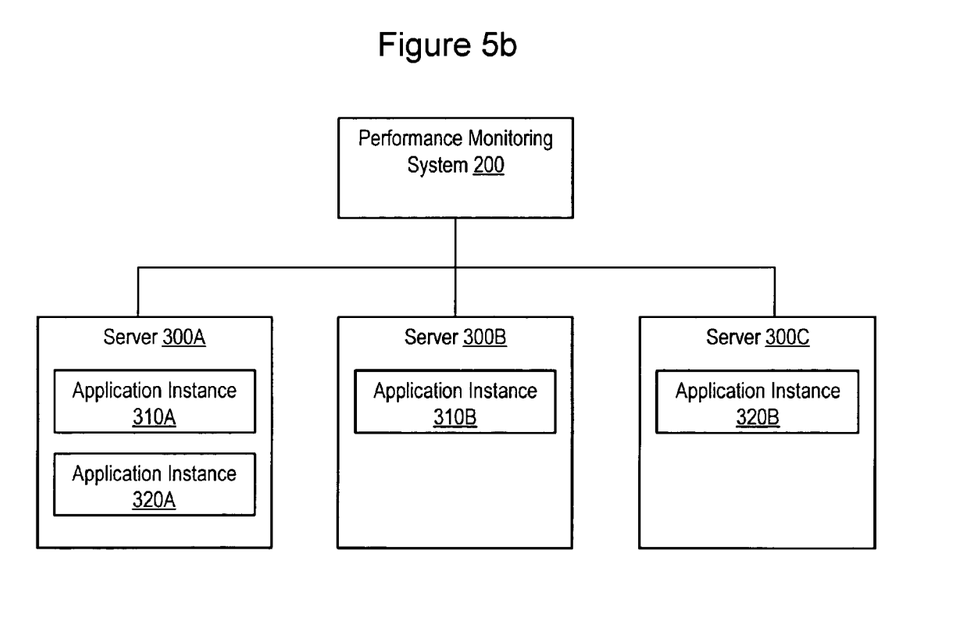

FIGS. 5a and 5b illustrate an example of an application instance 110 undergoing a migration event. FIG. 5a illustrates an exemplary configuration of servers and application instances 110 identical to that shown in FIG. 3a. In FIG. 5b, application instance 320A has migrated from server 300B to server 300A. More particularly, application instance 320A may cease operation on server 300B and may be resumed with the same data and configuration (e.g. state) on server 300A. In one embodiment, an application instance 110 may migrated due to a fail-over, wherein the application instance encounters a critical error and is restarted from a saved state on another server. Alternatively, in another embodiment an application instance 120 may be migrated for load-balancing reasons. For example, application instance 320A may be moved from server 300B to server 300A because more computational power is available on server 300A. In yet another embodiment an end user, such as a system administrator, may cause one or more application instances 110 to migrate from a particular server to free the server for shutdown or other maintenance procedures. It is noted that in various embodiments, migration for load balancing or fail-over reasons may be controlled by central control software or by an operating system installed on each server 300A-C. In some embodiments, when an application instance is migrated a corresponding measurement agent may also be migrated. The migration event may be detected by the measurement system which may initiate migration of the corresponding measurement agent.

Figure 6:
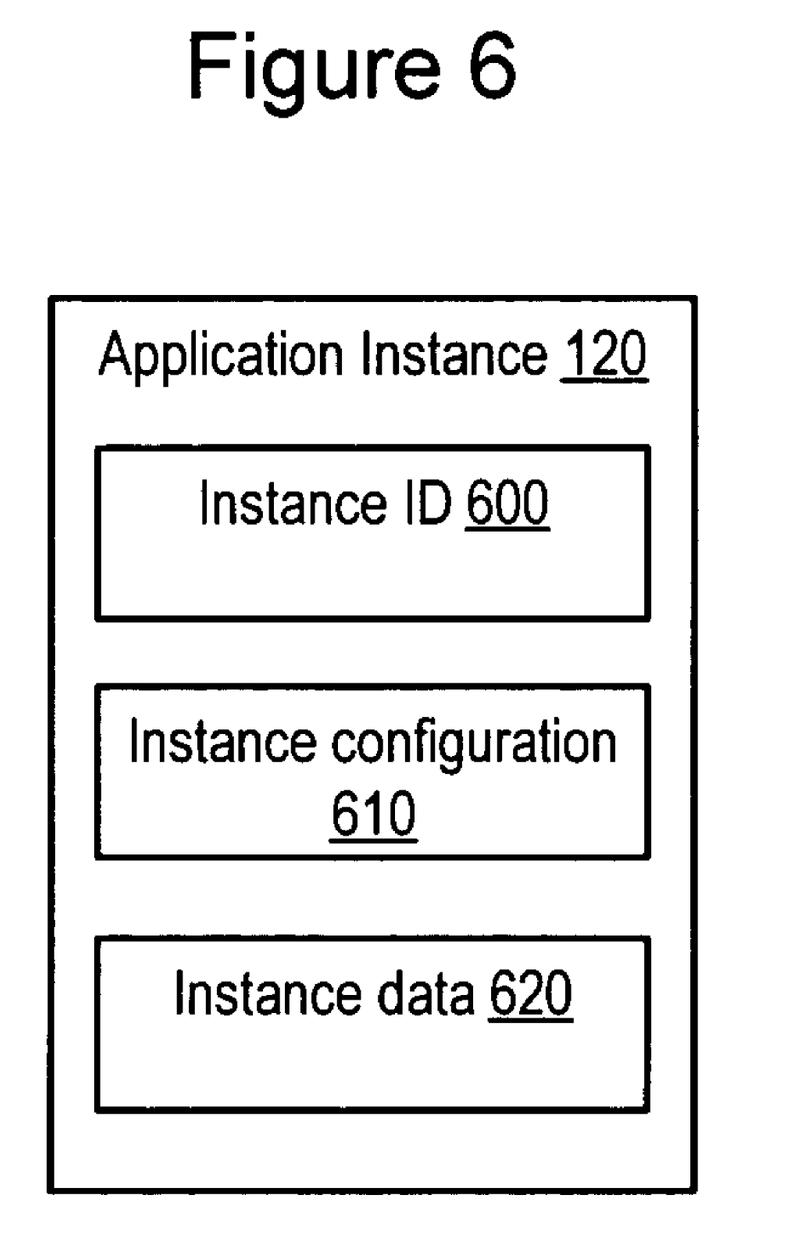
FIG. 6 is a block diagram of one embodiment of an application instance.

As illustrated in FIG. 6, an application instance 120 may comprise an instance ID 600, an instance configuration 610, and instance data 620. Instance ID 600 may be a piece of data, such as, for example, a number or alphanumeric string, operable to uniquely identify a specific application instance 120. Instance configuration 610 may be one or more variables that define the operation and configuration of the associated application instance 120. For example, instance configuration 610 may identify a specific network port to listen to for client service requests, or a particular server in a database tier to send database queries to. Instance data 620 may be one or more data variables which are created and modified in the process of carrying out operations of instance application 120. For example, instance data 620 may contain the IP address of a client system, or one or more state variables describing a current transaction.

It is noted that performance monitoring system 200 may be operable to track instance life cycle events including creation, destruction and migration and related observed performance data to these events. For example, performance monitoring system 200 may track an application instance 120 migrating from one server to another, and relate observed performance data to one or more migration events. In one embodiment, performance monitoring system 200 may be operable to track a migrating application instance 120 by an associated instance ID 600. For example, a migrating application instance 120 may be destroyed on a first server and recreated on a second server with the same instance ID 600, instance configuration 610 and instance data 620. Accordingly, performance monitoring system 200 may be operable to detect that a new application instance 120 has the same instance ID 600 as a previously destroyed application instance 120, and thereby determine that the application instance 120 has migrated from a first server to a second server. Alternatively, it is noted that performance monitoring system 200 may be operable to detect the migration of an application instance based on instance configuration 610 or instance data 620.

It is further noted that the application instance 120 in FIG. 6 is purely exemplary, and that in various embodiments, an application instance 120 may not have an instance ID 600, instance configuration 610, or instance data 620. Accordingly, in one embodiment performance monitoring system 200 may track the migration of an application instance 120 by communicating with software responsible for handling application fail-over or load balancing. In yet another embodiment performance monitoring system 200 may detect an end user such as a system administrator manually moving an application instance 120 from one server to another.

Figure 7:
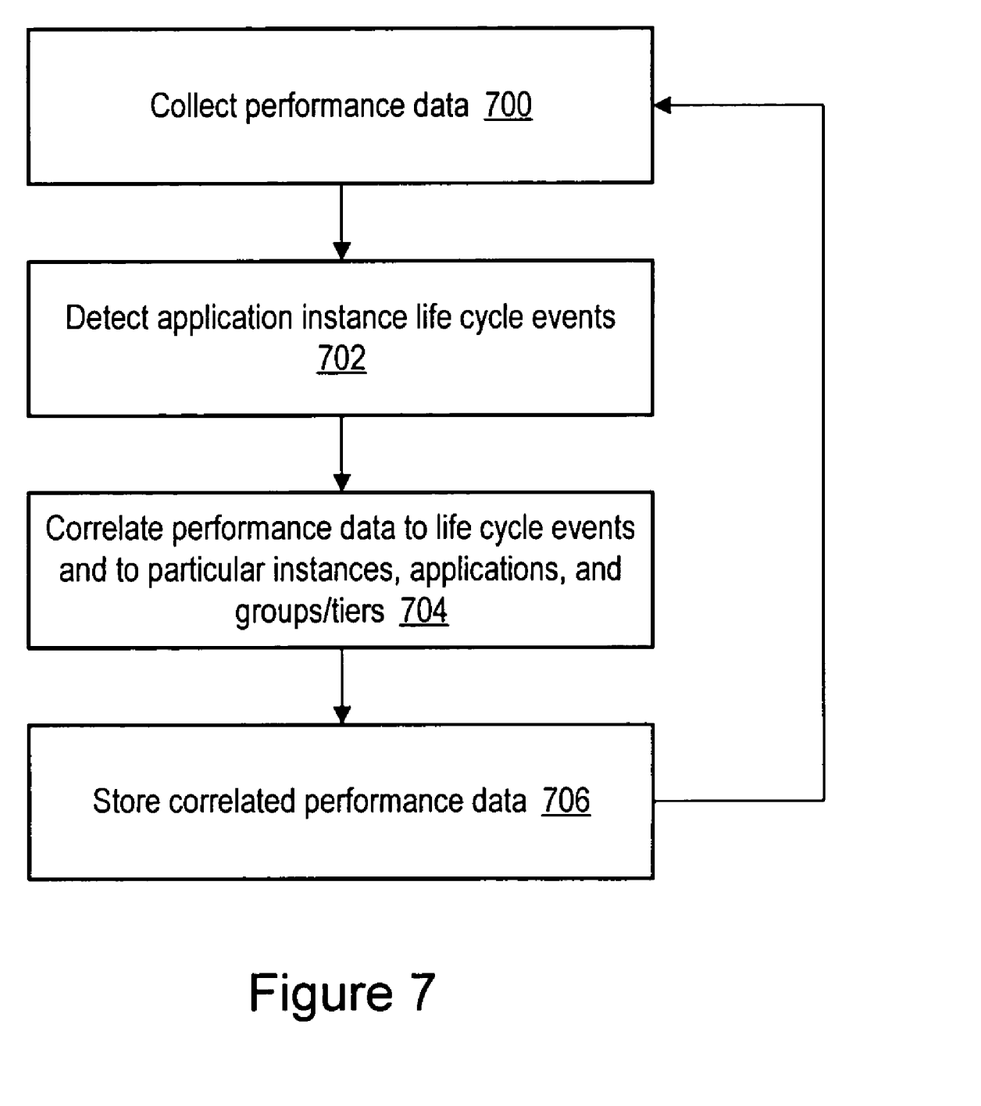
FIG. 7 is a flowchart illustrating one embodiment of a method for monitoring instance life cycle events.

Turning now to FIG. 7, a flow diagram of a method for monitoring instance life cycle events 130 is shown. In 700, performance monitoring system 200 may collect performance data for one or more applications executing on a cluster or utility computer system, for example. In one embodiment performance monitoring system 200 may collect data on response times in various technology tiers when servicing various client requests. Performance monitoring system 200 may further collect data on how often client requests are successfully completed, the IP addresses client requests originate from, the time of day each client request is made, and other data which may be later be analyzed by performance monitoring system 200, as described above. The performance monitoring system may monitor performance data for particular application instances, applications, application groups, technology tiers, or any combination thereof.

In 702, performance monitoring system 200 detects one or more instance life cycle events 130. As described above, performance monitoring system 200 may be operable to detect when an application instance 120 is created, destroyed, or migrated for various reasons. For example, performance monitoring system 200 may detect the creation of an instance of a first application 110 on a first server, and the destruction of an instance of a second application 110 on the same server. In further embodiments, performance monitoring system 200 may be operable to detect how long an application instance 120 takes to be created, to migrate from a first computer to a second computer, and to be destroyed.

In 704, performance monitoring system 200 correlates the collected performance data to the monitored instance life cycle events 130. More particularly, performance monitoring system 200 may be operable to determine how one or more instance life cycle events 130 effect the performance of one or more application instances, applications or groups/tiers. For example, performance monitoring system 200 may be operable to determine that the performance of an application instance 120 declined after a second application instance 120 of the same application 110 was created on the same server.

Performance monitoring system 200 may further be operable to determine how detected instance life cycle events 130 effect the performance of an application 110. For example, performance monitoring system 200 may be operable to chart the overall throughput of an application 110 depending on the number of instances of the application. Performance monitoring system 200 may also be operable to determine the effect of detected instance life cycle events 130 on applications 110 in an application tier 100. For example, performance monitoring system 200 may be operable to chart the overall throughput of an application tier 100 depending on the number of instances of various applications 110, or to chart the performance of an application tier as the number of instance migrations increases and decreases.

It is further noted that in one embodiment an end user such as a system administrator may be operable to utilize performance monitoring system 200 to display and analyze the correlation of performance data and instance life cycle events 130. For example, a system administrator may utilize console component 220 of performance monitoring system 200 to determine the effect of migrations on the performance of an application tier 100. In such an example, the system administrator may then be able to "drill down" and determine the effects of migrations on the performance of a specific application 110, or a specific application instance 120. The system administrator may further be able to examine data on the performance of specific servers in a cluster system, or the tasks which are most likely to cause instance failure or migration for a given application 110, for example. It is also noted that in some embodiments, an end user such as a system administrator may further be able to utilize the correlated performance information to optimize system performance. For example, the number of application instances 120 on a given server cluster may be optimized to ensure maximum efficiency, in accordance with an observed correlation between created application instances 120 and collected performance data.

In 706, performance monitoring system 200 may store correlated performance data. For example, in one embodiment performance monitoring system may store in performance warehouse 210 the response data of a given application instance 120 at particular times, along with an indication that the application instance 120 was created at a first time, migrated at a second time, and was destroyed at a third time. Performance monitoring system 200 may then return to 700, wherein the system continues to collect performance data.

Figure 8:
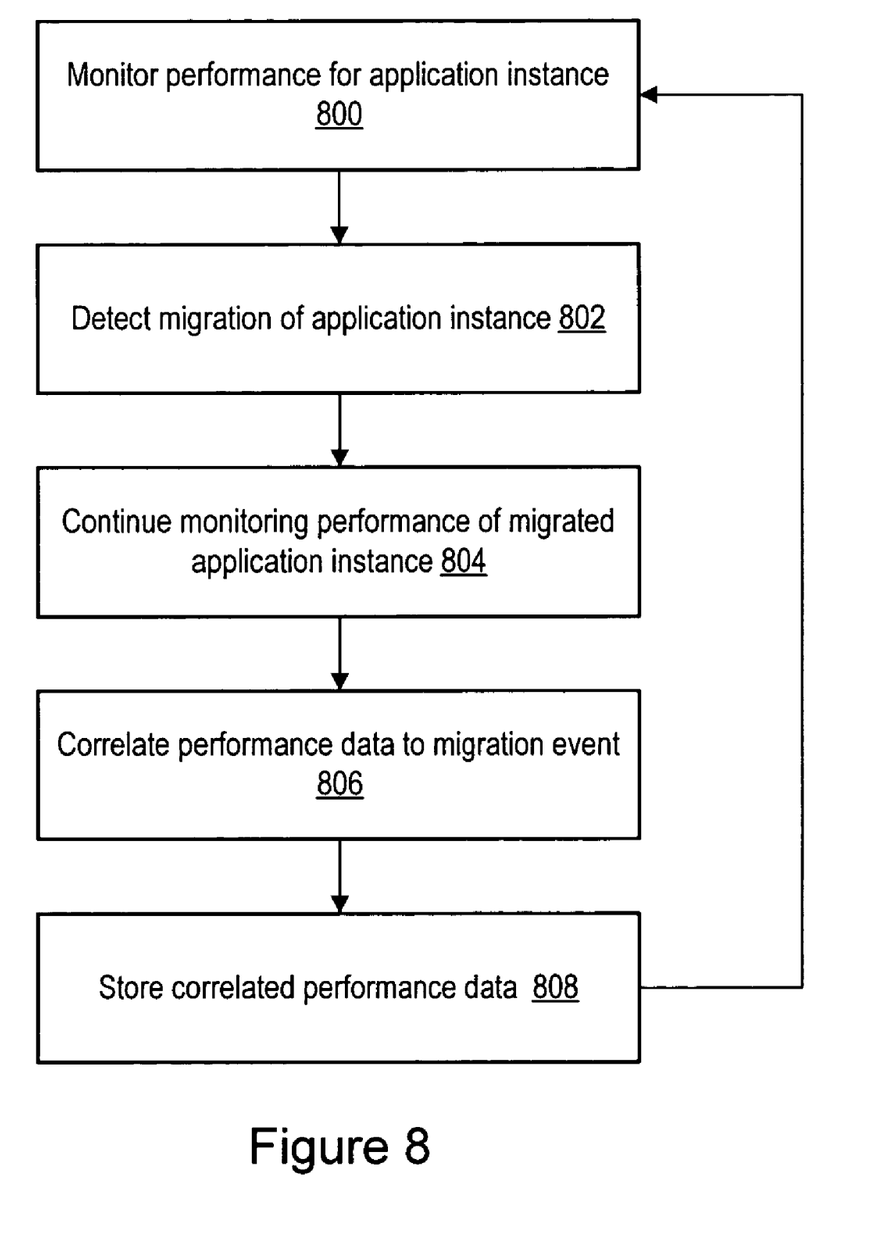
FIG. 8 is a flowchart illustrating one embodiment of a method for monitoring migration events.

Turning now to FIG. 8, a flow diagram of a method for monitoring migration events is shown. In 800, performance monitoring system 200 collects performance data related to one or more application instances 120. For example, in one embodiment performance monitoring system 200 may collect data on response times of application instances 120 servicing various client requests. Performance monitoring system 200 may also collect additional data, such as, for example, how often client requests are successfully completed, the IP addresses client requests originate from, the time of day each client request is made, and other data which may be later be analyzed by performance monitoring system 200, as described above.

In 802, performance monitoring system 200 detects the migration of one or more application instance 120. As described above, performance monitoring system 200 may be operable to detect when an application instance 120 migrates from one server to another due to fail-over or load balancing, or when an application instance is manually moved from one server to another by an end user such as a system administrator. In 804, performance monitoring system 200 continues to monitor the performance of the migrated application instances 120.

In 806, performance monitoring system 200 correlates the collected performance data to the monitored migration events. More particularly, performance monitoring system 200 may be operable to determine how one or more migration events effect the performance of one or more application instances 120. For example, performance monitoring system 200 may be operable to determine that the performance of an application instance 120 improved after migrating from a first server location to a second server location. In some embodiments performance monitoring system 200 may further be operable to determine the effect of migration events on applications 110 and application tiers 100. For example, performance monitoring system 200 may be operable to determine how various migration events added to the average response time of an application 110 or application tier 100. In one embodiment, an end user such as a system administrator may further be operable to utilize performance monitoring system 200 to "drill down" to see different perspectives on how migration events effected specific application instances 120, applications 110, and application tiers 100.

In 808, performance monitoring system 200 may store correlated performance data including the relationship of collected performance data to monitored migration events. For example, in one embodiment performance monitoring system may store the response times of a given application instance 120 in performance warehouse 210, along with an indication that the application instance 120 migrated from a first server to a second server at a given time. Performance monitoring system 200 may then return to 700, wherein the system continues to collect performance data.

Figure 9:
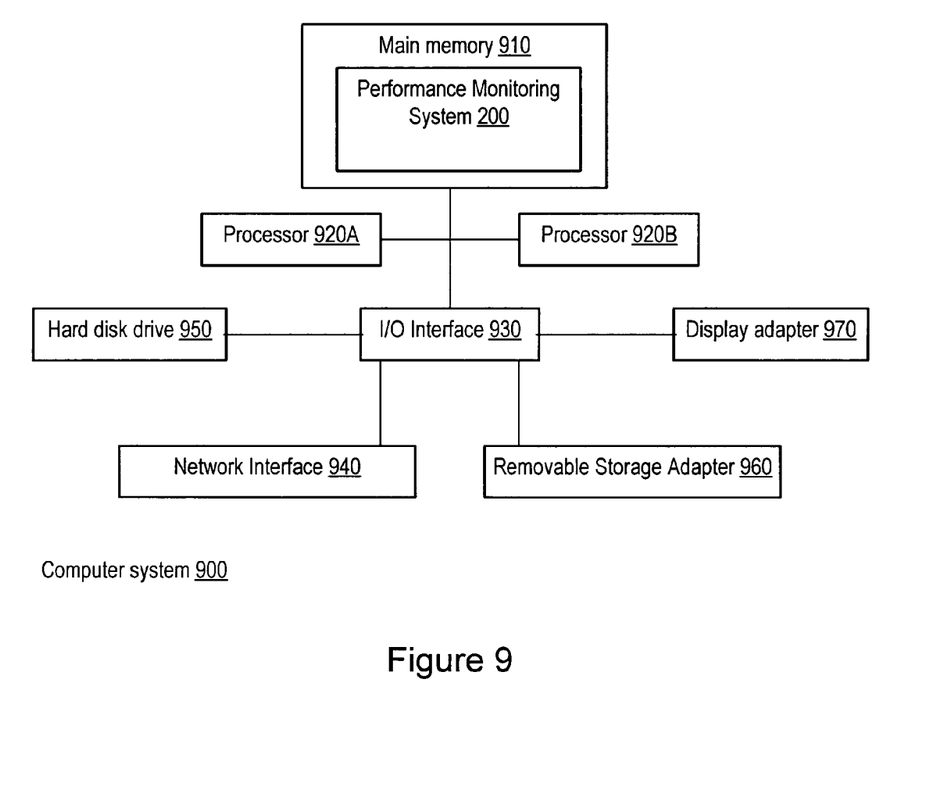
FIG. 9 is a block diagram of one embodiment of a computer system.

Turning now to FIG. 9, a hardware overview of exemplary computer system 900 is shown. Computer system 900 includes main memory 910, which is coupled to multiple processors 920A-B, and I/O interface 930. It is noted that the number of processors is purely illustrative, and that one or more processors may be resident on the node. I/O interface 930 further connects to network interface 940, hard disk drive 950, removable storage adapter 960, and display adapter 970. Such a system is exemplary of a laptop, desktop, server, or workstation.

Processors 920A-B may be representative of any of various types of processors such as an x86 processor, a PowerPC processor or a CPU from the SPARC family of RISC processors. Likewise, main memory 910 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 910 may include other types of suitable memory as well, or combinations of the memories mentioned above.

As described in detail above in conjunction with FIGS. 1-8, processors 920A-B of computer system 900 may execute software configured to perform the functions of performance monitoring system 200. The software may be stored in memory 910 of computer subsystem 900 in the form of instructions and/or data that implement the operations described above. Alternatively, computer system 900 may be a server operable to execute one or more application instances 120.

It is further noted that any of the embodiments described above may further include receiving, sending or storing instructions and/or data that implement the operations described above in conjunction with FIGS. 1-8 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
collecting performance data for one or more application instances, wherein the performance data is associated with the performance of said one or more application instances, wherein each application instance is a computer program executing on a computer system;
detecting one or more instance life cycle events associated with said one or more application instances, wherein said one or more instance life cycle events comprise at least one of: the creation of at least one of said one or more application instances, the destruction of at least one of said one or more application instances, and the migration of at least one of said application instances;
correlating said performance data to said one or more instance life cycle events; and
storing the correlated performance data.

2. The method of claim 1, wherein the one or more application instances are instances of an application, and wherein said correlating said performance data to one or more instance life cycle events comprises correlating the one or more instance life cycle events to the performance of the application.

3. The method of claim 2, wherein said correlating said performance data to one or more instance life cycle events comprises determining the change in performance of the application as the one or more application instances are created and destroyed.

4. The method of claim 2, wherein said correlating said performance data to one or more instance life cycle events comprises determining the change in performance of the application as the one or more application instances migrate from one location to another location.

5. The method of claim 1, wherein the one or more application instances are instances of a plurality of applications, wherein the plurality of applications are part of an application tier, and wherein said correlating said performance data to one or more instance life cycle events comprises correlating the one or more instance life cycle events to the performance of the application tier.

6. A method, comprising:
monitoring performance of an application instance that is a computer program executing on a computer system, wherein said monitoring comprises collecting performance data associated with the performance of the application instance executing on the computer system;
detecting a migration event associated with the application instance, wherein the migration event comprises the application instance migrating from a first location of execution to a second location of execution;
subsequent to said detecting, continuing to monitor the performance of the application instance;
correlating the performance data to the migration event; and
storing the correlated performance data.

7. The method of claim 6, wherein correlating performance data to the migration event comprises relating the performance data to the first and second locations.

8. The method of claim 6, wherein said detecting a migration event comprises tracking the application instance with an instance ID.

9. A computer accessible medium, including program instructions executable to implement a method comprising:
collecting performance data for one or more application instances, wherein the performance data is associated with the performance of said one or more application instances, wherein each application instance is a computer program executing on a computer system;
detecting one or more instance life cycle events associated with said one or more application instances, wherein said one or more instance life cycle events comprise at least one of: the creation of at least one of said one or more application instances, the destruction of at least one of said one or more application instances, and the migration of at least one of said one or more application instances;

correlating said performance data to said one or more instance life cycle events; and storing the correlated performance data.

10. The computer accessible medium of claim 9, wherein the one or more application instances are instances of an application, and wherein said correlating said performance data to one or more instance life cycle events comprises correlating the one or more instance life cycle events to the performance of the application.

11. The computer accessible medium of claim 10, wherein said correlating said performance data to one or more instance life cycle events comprises determining the change in performance of the application as the one or more application instances are created and destroyed.

12. The computer accessible medium of claim 10, wherein said correlating said performance data to one or more instance life cycle events comprises determining the change in performance of the application as the one or more application instances migrate from one location to another location.

13. The computer accessible medium of claim 9, wherein the one or more application instances are instances of a plurality of applications, wherein the plurality of applications are part of an application tier, and wherein correlating said performance data to one or more instance life cycle events comprises correlating the one or more instance life cycle events to the performance of the application tier.

14. A computer accessible medium, including program instructions executable to implement a method comprising:

monitoring performance of an application instance that is a computer program executing on a computer system, wherein said monitoring comprises collecting performance data associated with the performance of the application instance executing on the computer system;

detecting a migration event associated with the application instance, wherein the migration event comprises the application instance migrating from a first location of execution to a second location of execution;

subsequent to said detecting, continuing to monitor the performance of the application instance;

correlating the performance data to the migration event; and storing the correlated performance data.

15. The computer accessible medium of claim 14, wherein correlating performance data to the migration event comprises relating the performance data to the first and second locations.

16. The computer accessible medium of claim 14, wherein detecting a migration event comprises tracking the application instance with an instance ID.

17. A performance monitoring system, comprising:

a processor;

a memory coupled to the processor and storing program instructions executable by said processor to implement:

collecting performance data for one or more application instances, wherein the performance data is associated with the performance of said one or more application instances, wherein each application instance is a computer program executing on a computer system;

detecting one or more instance life cycle events associated with said one or more application instances, wherein said one or more instance life cycle events comprise at least one of: the creation of at least one of said one or more application instances, the destruction of at least one of said one or more application instances, and the migration of at least one of said one or more application instances;

correlating said performance data to said one or more instance life cycle events; and storing the correlated performance data.

18. The performance monitoring system of claim 17, wherein the one or more application instances are instances of an application, and wherein said correlating said performance data to one or more instance life cycle events comprises correlating the one or more instance life cycle events to the performance of the application.

19. The performance monitoring system of claim 18, wherein said correlating said performance data to one or more instance life cycle events comprises determining the change in performance of the application as the one or more application instances are created and destroyed.

20. The performance monitoring system of claim 18, wherein said correlating said performance data to one or more instance life cycle events comprises determining the change in performance of the application as the one or more application instances migrate from one location to another location.

21. The performance monitoring system of claim 17, wherein the one or more application instances are instances of a plurality of applications, wherein the plurality of applications are part of an application tier, and wherein correlating said performance data to one or more instance life cycle events comprises correlating the one or more instance life cycle events to the performance of the application tier.

22. A performance monitoring system, comprising:

a processor;

a memory coupled to the processor and storing program instructions executable by said processor to:

monitor performance of an application instance that is a computer program executing on a computer system, wherein to monitor said performance the program instructions are executable to collect performance data associated with the performance of the application instance executing on the computer system;

detect a migration event associated with the application instance, wherein the migration event comprises the application instance migrating from a first location of execution to a second location of execution;

subsequent to detecting the migration event, continue to monitor the performance of the application instance;

correlate the performance data to the migration event; and store the correlated performance data.

* * * * *